April 20, 1954  F. H. ADAMEK  2,675,640

FISHHOOK CARRIER

Filed Sept. 26, 1949

Inventor

Frank H. Adamek

By Clarence A. O'Brien
and Harvey B. Jacobson
Attorneys

Patented Apr. 20, 1954

2,675,640

UNITED STATES PATENT OFFICE 2,675,640

FISHHOOK CARRIER

Frank H. Adamek, Powers, Oreg.

Application September 26, 1949, Serial No. 117,851

1 Claim. (Cl. 43—57.5)

This invention relates to a carrier or container for fish hooks and artificial flies and has for its primary object to provide a sturdy, compact holder, which will protect the fish hooks from injury, from becoming tangled by individually supporting the fish hooks in a secure and safe manner.

Another important object of this invention is to enable a plurality of fish hooks to be carried from place to place in a convenient manner.

Another important object of this invention is to provide a transparent casing or tube, within which is detachably mounted a supporting rod having a plurality of discs secured thereon, the discs being adapted to support the hooks engaged therein.

These and ancillary objects and structural features of merit are attained by this invention, a preferred embodiment of which is set forth in the following description and illustrated in the accompanying drawings, wherein.

Figure 1:
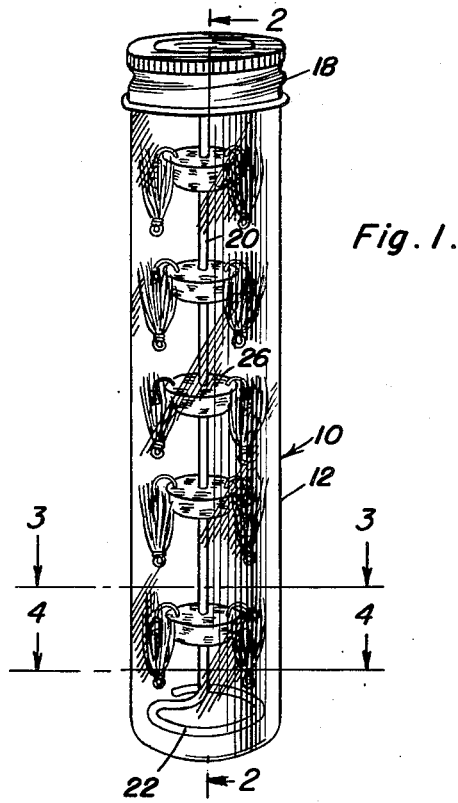
Figure 1 is an elevational view of a carrier, embodying the features of the present invention.

In the accompanying drawing, the carrier 10 includes a cylindrical elongated container casing or tube 12 having a closed end 14 and an open end 16, the latter being externally threaded to receive a closure cap 18. It is to be noted that the tube is transparent and the same may be molded from suitable plastic material so as to be unbreakable.

Figure 2:
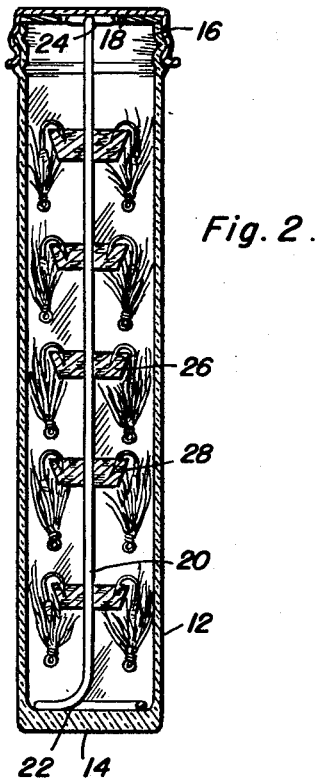
Figure 2 is a vertical sectional view taken on line 2—2 of Figure 1.
Figure 3:
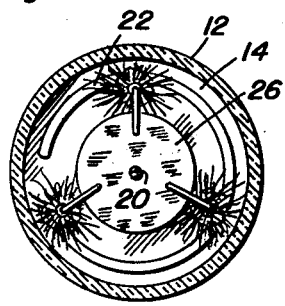
Figure 3 is a horizontal section thereof, taken on line 3—3 of Figure 1.
Figure 4:
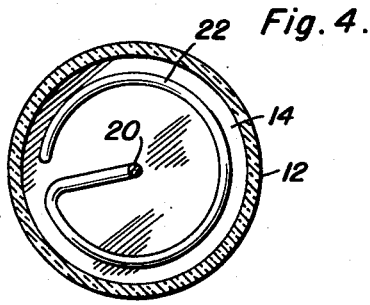
Figure 4 is a transverse sectional view taken on line 4—4 of Figure 1.

A wire rod 20 is centrally disposed longitudinally in the tube or casing, the inner or free end 22 of the rod being bent transversely of the axis of the rod to form a circular base in the form of a substantially flat coil disposed coaxially to the rod. The coil 22 is adapted to be seated under compression on the inner end 14 of the tube 12 when the cap 18 is screwed home and supports the rod 20 within said tube. Further as shown to advantage in Figure 2 of the drawing, the rod 20 includes a bend between its major portion and the coil 22 to provide for slight flexing when the cap 18 is threaded on the end portion 16 of the container or tube 12. The upper end 24 of the rod is bent transversely of the axis of the rod to form an enlarged head, which is suitably secured centrally to the underside of the closure cap 18. Thus, removal of the cap removes the rod 20 from the casing.

A plurality of spaced discs 26 are secured concentrically on the rod 20. The discs may be formed of cork or felt or the like material and are adapted to receive the pointed ends of the hook portions of the flies or the barbed end of the plain fish hooks. The discs may be glued or otherwise affixed in spaced relation to each other on the rod, the discs having inwardly downwardly slanting side walls 28, so that the shank of the hooks may extend downwardly over the discs and the artificial flies are held out of possible contact with the disc or inner surface of the tube walls.

It can be seen that the hooks are held in a protected manner and are viewable through the transparent side walls of the tube. To remove a desired hook from the supporting discs, the cap 18 is unscrewed from the top of the tube, the inner end 22 of the rod rotating on the closed end 14 of the tube. When the cap is removed from the tube, the rod 20 can be slid upwardly out of the tube by moving the cap in a straight line motion away from the tube.

Of course, since many other purposes and modifications of this invention will become readily apparent to those skilled in the art upon a perusal of the foregoing description, it is to be understood that certain changes in style, size and components may be effected without a departure from the spirit of the invention and within the scope of the appended claim.

Having described the invention, what is claimed as new is:

A fish hook carrier comprising an elongated tubular container including a closed end and a threaded open end portion, a removable screw cap for said open end portion of said container, a wire rod having one end fixed centrally in the cap and insertable longitudinally in the container, means for mounting fish hooks on the rod, and a substantially flat, coaxial coil on the free end of said rod engageable under compression with the closed end of the container when the cap is screwed home for retaining said free end of said rod centrally in said container, the said rod having a bend between its major portion and the coil to provide for slight flexing when the cap is threaded on the container.

References Cited in the file of this patent

UNITED STATES PATENTS

| Number | Name | Date |
| --- | --- | --- |
| 425,673 | Heberling | Apr. 15, 1890 |
| 623,027 | Mills | Apr. 11, 1899 |
| 633,593 | Houston | Sept. 26, 1899 |
| 1,308,253 | Oftedahl | July 1, 1919 |
| 1,624,233 | Griffin | Apr. 12, 1927 |
| 1,732,571 | Smith | Oct. 22, 1929 |
| 1,888,304 | Bekeart | Nov. 22, 1932 |
| 2,225,309 | Lawrence | Dec. 17, 1940 |

FOREIGN PATENTS

| Number | Country | Date |
| --- | --- | --- |
| 388,201 | Great Britain | Feb. 23, 1933 |